(12) United States Patent
Spallek et al.

(10) Patent No.: US 11,096,866 B2
(45) Date of Patent: Aug. 24, 2021

(54) CONTAINER CONSISTING OF PLASTIC MATERIAL, AND METHOD FOR PRODUCING A CONTAINER OF THIS TYPE

(71) Applicant: KOCHER-PLASTIK MASCHINENBAU GMBH, Sulzbach-Laufen (DE)

(72) Inventors: Michael Spallek, Ingelheim (DE); Johannes Geser, Gerlingen (DE); Alexander Hammer, Gaildorf (DE); Manfred Schreckenhoefer, Sulzbach-Laufen (DE); Martin Groh, Gaildorf (DE)

(73) Assignee: KOCHER-PLASTIK MASCHINENBAU GMBH, Sulzbach-Laufen (DE)

( * ) Notice: Subject to any disclaimer, the term of this patent is extended or adjusted under 35 U.S.C. 154(b) by 369 days.

(21) Appl. No.: 16/074,822

(22) PCT Filed: Feb. 10, 2017

(86) PCT No.: PCT/EP2017/000191
§ 371 (c)(1),
(2) Date: Aug. 2, 2018

(87) PCT Pub. No.: WO2017/148570
PCT Pub. Date: Sep. 8, 2017

(65) Prior Publication Data
US 2019/0038508 A1   Feb. 7, 2019

(30) Foreign Application Priority Data
Feb. 29, 2016 (DE) ..................... 10 2016 002 467.4

(51) Int. Cl.
*A61J 1/14* (2006.01)
*B65D 1/02* (2006.01)
(Continued)

(52) U.S. Cl.
CPC ............... *A61J 1/1493* (2013.01); *A61J 1/05* (2013.01); *B29C 49/00* (2013.01);
(Continued)

(58) Field of Classification Search
CPC ........... A61J 1/1493; A61J 1/05; B29C 49/00; B29C 49/4273; B65D 1/0292; B65D 23/003; B65D 1/002; B65D 2501/0081
(Continued)

(56) References Cited

U.S. PATENT DOCUMENTS 3,321,096 A * 5/1967 Hebel ...................... B65D 1/10
  215/382
3,810,503 A * 5/1974 Lewis, Jr. ................ A61J 1/10
  383/96
(Continued)

FOREIGN PATENT DOCUMENTS

DE   2 361 103     6/1974
DE   103 47 908    5/2005
(Continued)

OTHER PUBLICATIONS

International Search Report dated Apr. 21, 2017 in International (PCT) Application No. PCT/EP2017/000191.

*Primary Examiner* — J. Gregory Pickett
*Assistant Examiner* — Niki M Eloshway
(74) *Attorney, Agent, or Firm* — Wenderoth, Lind & Ponack, L.L.P.

(57) ABSTRACT

A container of plastic material is produced using the blow, fill and seal method, with the filler material, enclosed by a container wall (15, 20) that can be autoclaved. At least one shape (19, 21, 23, 25, 29, 33) is provided in the container wall (15, 20) that ensures, despite a low relative air volume in the container, that when administering the filler material by infusion, the container wall (15, 20) collapses at least (Continued)

partially reducing the volume, without aeration of the container.

18 Claims, 3 Drawing Sheets

(51) Int. Cl.
| | |
|---|---|
| *B29C 49/42* | (2006.01) |
| *B29C 49/48* | (2006.01) |
| *B65D 23/00* | (2006.01) |
| *B65D 51/00* | (2006.01) |
| *A61J 1/05* | (2006.01) |
| *B29C 49/00* | (2006.01) |
| *B29K 23/00* | (2006.01) |

(52) U.S. Cl.
CPC ...... *B29C 49/4273* (2013.01); *B29C 49/4802* (2013.01); *B65D 1/0292* (2013.01); *B65D 23/003* (2013.01); *B65D 51/002* (2013.01); B29C 2049/4807 (2013.01); B29K 2023/12 (2013.01); B65D 2501/0081 (2013.01)

(58) Field of Classification Search
USPC .......................... 220/751, 666; 215/900, 382
See application file for complete search history.

(56) References Cited

U.S. PATENT DOCUMENTS

| | | | | |
|---|---|---|---|---|
| 3,926,341 | A | * | 12/1975 | Lhoest ................. A61J 1/05 |
| | | | | 222/95 |
| 5,054,631 | A | * | 10/1991 | Robbins, III ........ B65D 1/0292 |
| | | | | 215/389 |
| 5,255,808 | A | * | 10/1993 | Tobler ................. B65D 1/0292 |
| | | | | 206/218 |
| 6,170,712 | B1 | | 1/2001 | Kasboske |
| 8,215,509 | B2 | * | 7/2012 | Kuboi ................. B65D 1/0292 |
| | | | | 215/381 |
| 9,392,862 | B1 | * | 7/2016 | Hajianpour ......... B65D 23/003 |
| 2009/0270830 | A1 | | 10/2009 | Sano et al. |
| 2011/0240673 | A1 | | 10/2011 | Araujo et al. |
| 2018/0290783 | A1 | * | 10/2018 | Brandenburger .... B65D 1/0223 |

FOREIGN PATENT DOCUMENTS

| | | | | |
|---|---|---|---|---|
| DE | 10 2013 012 809 | | 2/2015 | |
| EP | 0 511 596 | | 11/1992 | |
| EP | 2 067 464 | | 6/2009 | |
| JP | 06247448 A | * | 9/1994 | .......... B65D 1/0292 |
| JP | 8-72843 | | 3/1996 | |
| JP | 2003237758 A | * | 8/2003 | .......... B65D 1/0292 |
| JP | 2004-175406 | | 6/2004 | |
| WO | 2012/069080 | | 5/2012 | |

* cited by examiner

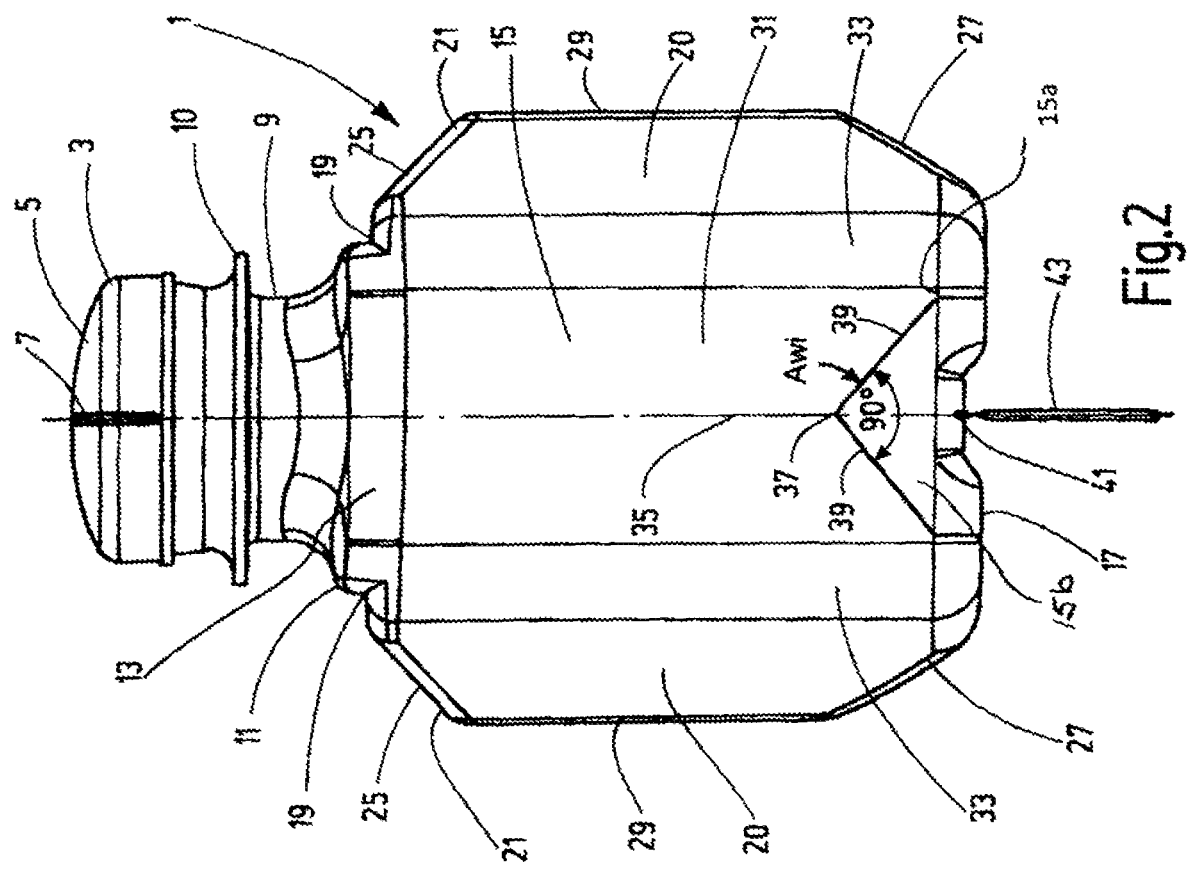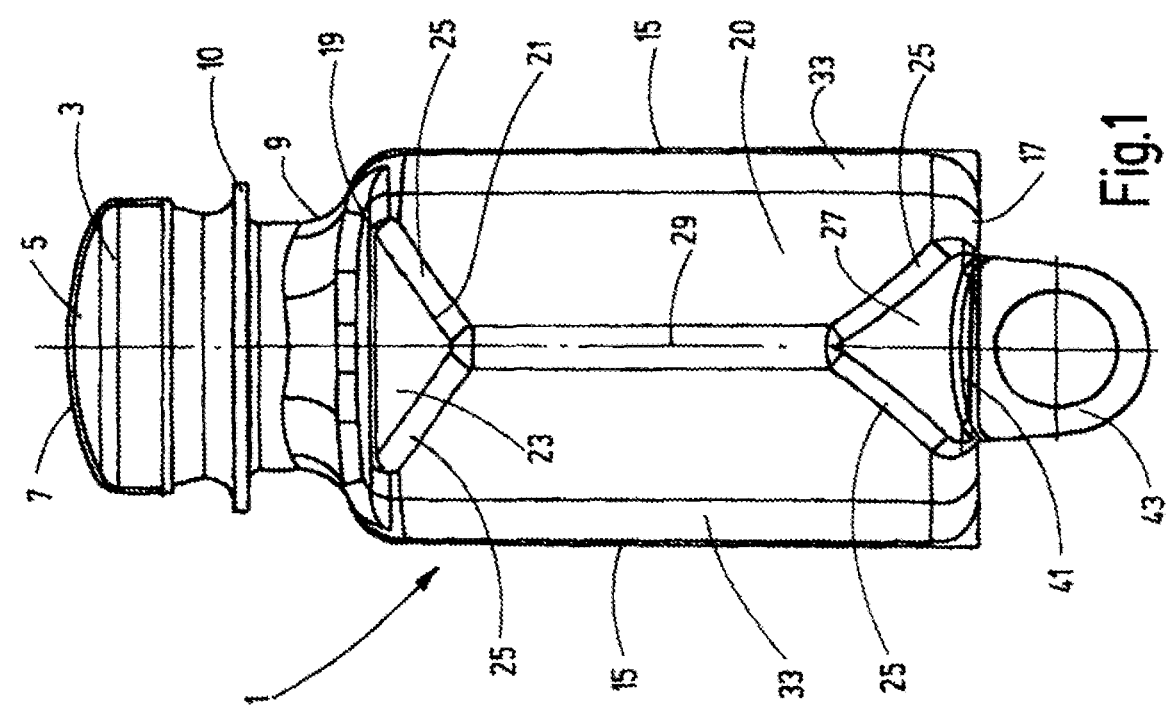

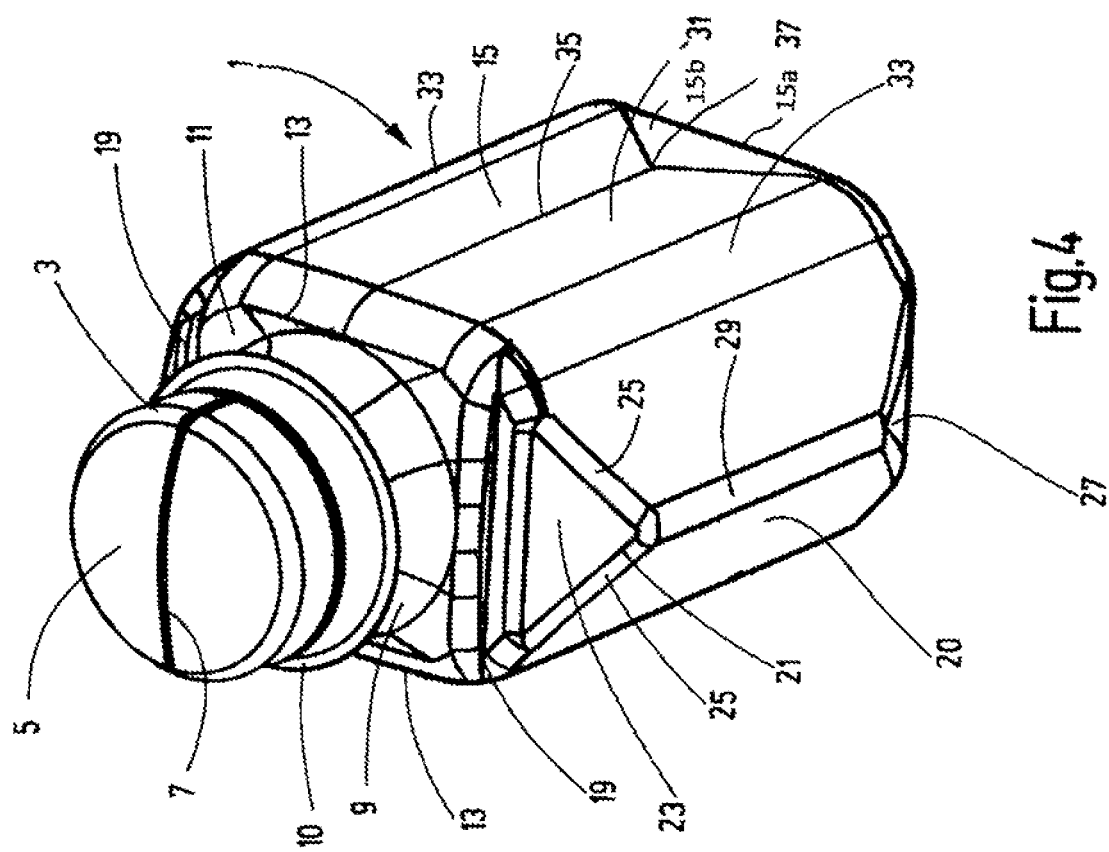
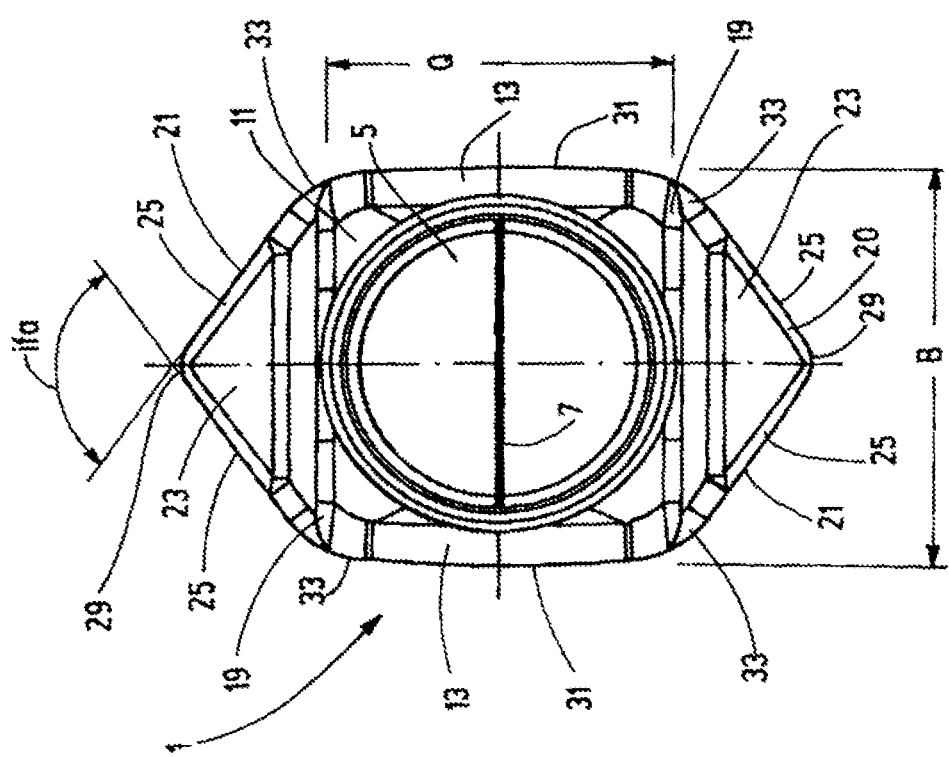

CONTAINER CONSISTING OF PLASTIC MATERIAL, AND METHOD FOR PRODUCING A CONTAINER OF THIS TYPE

FIELD OF THE INVENTION

The invention relates to a container of plastic material, which is produced using the blow, fill and seal method. The filler material enclosed by a container wall that can be autoclaved. The invention further relates to a method for producing a container of this type.

BACKGROUND OF THE INVENTION

A high packing density is required when packaging bulky drugs and medicinal products, such as infusion or flushing solutions. Unnecessarily large and heavy packages lead to high costs in terms of material use, transport, and storage. For this reason, the glass bottles frequently used in the past for infusion solutions have largely been replaced with plastic containers. In a particularly rational manner, containers of this type are produced by the known blow, fill and seal (BFS) method, which is also known in the professional world under the designation (DE 103 47 908 AI, DE 10 2013 012 809 A1) "Bottelpack®-system". A substantial advantage of such containers for medical and/or pharmaceutical applications is that the contents only come in contact with the polymer forming the container material. Containers produced and filled using this BFS method ensure that the contents remain germ-free/sterile for prolonged periods.

In order to permit easy and safe handling of such containers, users prefer relatively rigid and stable bottles. For example, medications are injected into infusion solutions or emulsions or suspensions for infusion such as isotonic saline solution, mannitol or glucose solutions, for example. For cannulas, this user preference can be accomplished much more easily using more rigid containers than using mechanically highly unstable, thin pouches.

However, as a consequence of this user requirement, rigid containers cannot be emptied completely without allowing a pressure equalization (aeration). In the case of glass containers, this is typically accomplished using suitable aerated infusion devices (see FIG. 1 in DIN EN ISO 8536-4:2011-01). However, for medical reasons aeration is not desired because of the associated risk of microbial contamination. Preference is then given to non-aerated infusion devices (see FIG. 2 in DIN EN ISO 8536-4:2011-01). On the other hand, for medical reasons it is necessary for infusion solutions in the sealed container to be terminally sterilized, which according to European specifications is achieved by autoclaving at temperatures of 121° C. for a period of at least 20 minutes. This need means that polymers having a suitably high heat distortion temperature must be used for the container production. This heat resistance requirement precludes the use of soft polyethylene (LDPE) because of the excessively low heat distortion temperature and necessitates the use of substantially more rigid polypropylene. However, the autoclaving in a high temperature range and the convenient handling of relatively rigid polypropylene containers thus made may negatively impact the discharge behavior of polypropylene containers during infusion processes without aeration if those containers are nearly completely filled and contain only a small relative air volume. While soft bottles and pouches collapse at small pressure differences, the rigidity of the container prevents such a pressure equalization.

In emergencies, infusions are frequently administered as pneumatic pressure infusions using pressure infusion apparatuses (ISO 8536-8). To this end, the infusion container is placed in an inflatable cuff, which exerts an increased pressure on the bottle from the outside and the contents of the bottle. Here again, a low restoring force of the container is a key criterion for ensuring that the infusion is administered as quickly and as uniformly as possible.

SUMMARY OF THE INVENTION

To address these problems, the invention is based on the object of providing an autoclavable plastic container produced using the BFS method that, when almost completely filled, empties completely during the infusion process even without aeration.

In accordance with the invention, this object is basically achieved by a container having, as an essential feature of the invention, is at least one shape in the container wall, which ensures, in spite of a high filling ratio, that the container wall collapses at least partially reducing the volume when the filler material is administered by infusion, without the container being aerated. The design resulting in the collapsing of the container wall and hence in the volume reduction of the inner volume of the container during the infusion process provides the advantageous opportunity of producing containers using the BFS method that, in spite of the use of more rigid materials, ensure a reliable discharge during infusion processes without aeration.

Plastic materials having high heat distortion temperatures such as polypropylene, which are sufficiently heat resistant to autoclaving, can then be used with particular advantage as container materials well-suited for the BFS method.

In advantageous exemplary embodiments, the container wall is integrally formed with a hermetically sealed head part, which is arranged on one of its end faces and which serves as an opening for extracting the container filler material. The containers can be easily produced in this form by molding tools of simple design.

In advantageous exemplary embodiments, the container is rectangularly shaped in terms of its basic design and has projecting wall parts on two opposite container wall sides with shapes, which are conically inclined, in pairs, toward one another and mutually form a cone angle (ifa) of 110° or less.

With particular advantage, the projecting wall part shape can in each case form a shoulder surface in the form of a virtual isosceles triangle.

For a largely rectangular shape of the container, if one of its end faces is viewed from above, the width (Q) of a given container wall side in proportion (irsv) to the width (B) of an adjacent container wall side is preferably in the range of 0.7 to 1.2, wherein particular preference is given to the range of 0.8 to 1.1.

In a particularly advantageous manner, the arrangement can be such that starting from its two end faces and the allocatable container wall side, the shoulder surface slopes down, as a further shape in the form of a wall triangle, toward the projecting wall parts delimiting the cone angle (ifa), preferably at an angle of 30° to 60°, particularly preferably of 45°.

For facilitating the demolding process when blow molding and as a further shape, a gradually sloping recess can be formed on the opposite container wall sides. The recess extends in a center line along the longitudinal axis, ends at a distance from the bottom, and splits from there toward the adjacent front face into two end lines, which mutually form a 90° angle at the point of the transition to the center line.

In containers formed from rigid polypropylene material, the average thickness of the container wall is preferably 0.3 mm to 0.5 mm.

A hanging tab can advantageously be disposed on the front face forming a container bottom, which opposes and faces away from the front face with the head part. If the hanging tab is downfoldable, a recess can be formed on the container bottom, in which the downfolded hanging tab can be received in such a way that a level base remains on the container bottom.

A method for producing the container is also the subject matter of the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a side view of a container according to an exemplary embodiment of the invention, drawn 1.3 times larger than normal size and designed for a filling capacity of approx. 100 ml;

FIGS. 2 and 3 are a front view and a top view of the head end, respectively, of the container of FIG. 1, FIG. 4 is a perspective view of the exemplary embodiment of the container;

DETAILED DESCRIPTION OF THE INVENTION

Figure 7:
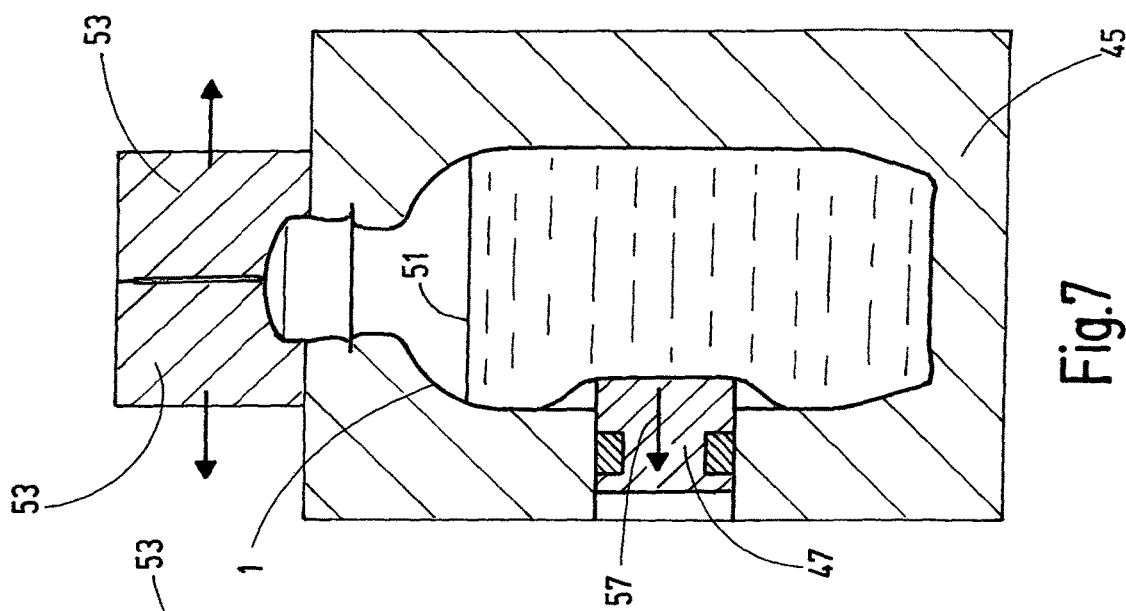
FIGS. 6 and 7 are highly simplified side views in section of work steps of the filled container depicted during the pre-collapsing and sealing, respectively.

FIGS. 1 through 4 show an exemplary embodiment of a finished container 1 in accordance with the invention that is designed for a filling capacity of ca. 100 ml. The container 1 in these figures is drawn ca. 1.3 times its natural size. The container 1 is formed from polypropylene having an average wall thickness of 0.4 mm, filled, and sealed using the BFS method, wherein a membrane 5 is formed as a top closure element on the head part 3. During use, this membrane serves as an area that can be pierced by a cannula, an injection needle, or an infusion device. The mold separation line 7 extending over the membrane 5, which is formed during the process of removing the container 1 produced by the BFS method from the blow mold, reinforces the membrane 5 against inversion during the piercing.

The round head part 3 transitions via a radially projecting flat collar 10 and a neck 9 into the shoulder 11 forming the top end face of the container 1, which end face is rectangular in outline. In each case a container main wall 15 that extends to the bottom 17 and adjoins the two opposing side edges 13 of the sides of the rectangular outline of the shoulder 11. At the other two side edges of the shoulder 11, in each case a recessed, optional shoulder notch 19 is formed, adjoined by the side shoulders 21, which, together with other wall parts, form container wall sides 20 projecting from the rectangular basic shape. These side shoulders 21 have, adjacent to the associated optional shoulder notch 19, a side shoulder surface 23 having an approximately triangular outline, which surfaces are delimited on the outside by shoulder folds 25. These folds 25 mutually form a cone angle ifa of 110°. As can be discerned in the figures and most clearly in FIG. 2, the planes of the triangular side shoulder surfaces 23 slope downward from the optional shoulder notch 19. The angle of inclination is about 45°. In analogous fashion to the side shoulder surfaces 23 facing the viewer in FIGS. 3 and 4, starting from the bottom container end face, lower triangular side shoulder surfaces 27 are formed between the shoulder folds 25. A side fold 29 extending between the cone tips of the top side shoulder surface 23 and the bottom side shoulder surface 27 forms the end edge of the projecting container wall side 20. Longer side folds 33, each running parallel to the shorter side folds 29, are located between the relevant projecting container wall side 20 and each of the other container wall sides 31 adjoining the sides thereof, which form the container main walls 15.

In FIG. 3, the dimensions of two opposing sides of the rectangular basic shape, more precisely the width of the container wall side 31, are designated with Q, and the dimension of the other sides of the rectangular basic shape, in other words the width of the projecting container wall side 20, is designated with B. In the case of the invention, this inner rectangle side ratio irsv=QB is in the range of 0.7 to 1.2, preferably in the range of 0.8 to 1.2. In the exemplary embodiment depicted in the drawing, the value of irsv is approximately 1.1. As can be discerned most clearly in FIGS. 2 and 4, the container wall sides 31 forming the non-projecting or planar main walls 15 have end edges 15a at abutting a base end of the bottom 17 and slight recesses or sloping depressions 15b that are planar. Starting from the longer side folds 33, each slight recess slopes down to a center line 35 that extends along the longitudinal axis of the top side edge 13 concerned to an end point 37. At end point 31, the center line 35 splits into end lines 39 that mutually form an angle Awi of 90° and extend to the end edges 15a at the base end of the bottom part 17. End lines 39 are in the plane of the respective planar main walls 15. The hypotenuse or base line of each sloping depression 15b extends along the end edge of the respective main wall 15, with each sloping depression 15b being planar and forming a right triangular surface between the end lines 39 and its base line. An optional hanging tab 43 is formed thereon.

Figure 6:
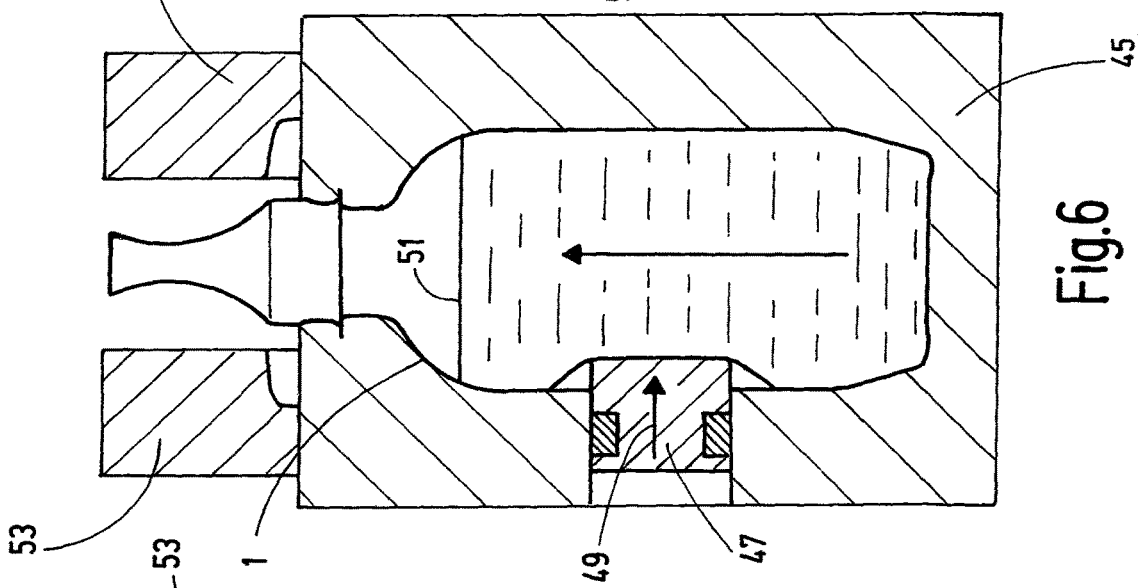
Figure 5:
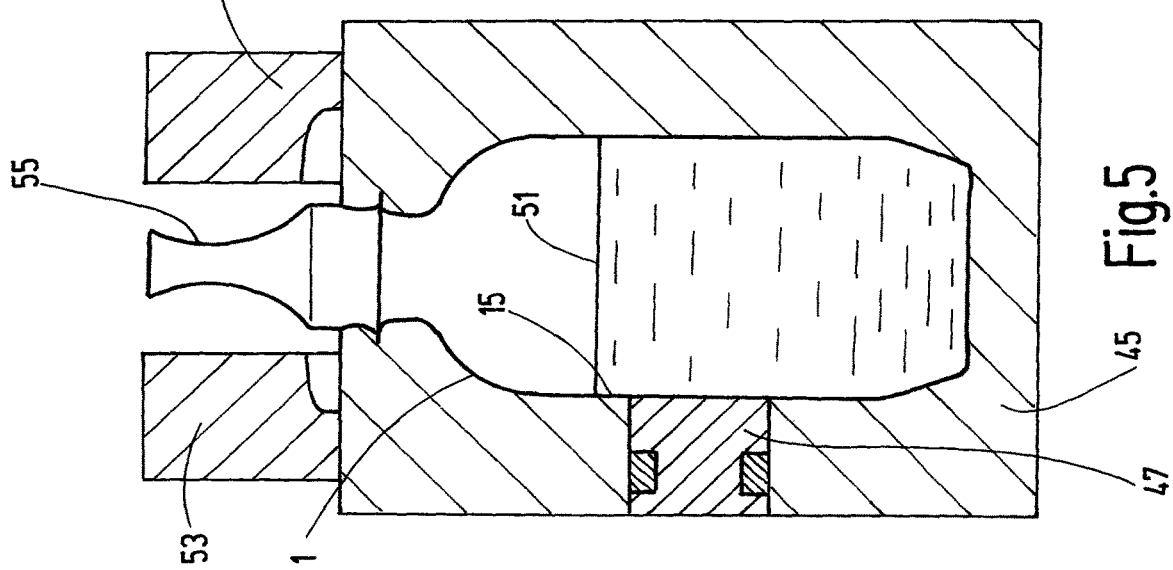
FIG. 5 is a highly simplified, side view in section of a blow mold used for producing a container in accordance with the invention, which enables a pre-collapsing of the container.

The shaping of the container in accordance with the invention effects the collapsing of the container 1 during infusion processes performed without aeration in spite of a more rigid container material, such as polypropylene, and makes it possible to provide the container 1 in accordance with the invention with a very high filling ratio. In the production of the container 1 using the BFS method, in accordance with the invention, it is then also possible to proceed in a supporting manner such that after the filling and prior to the sealing of the container 1, a pre-collapsing is performed that results in a reduction of the air volume remaining in the container 1. In the form of a schematic diagram, FIGS. 5 through 7 show the corresponding process steps during the manufacturing process. As shown, the pre-collapsing takes places in such a way that at least one and preferably two movable dies 47 are arranged in the blow mold 45. Only one movable die 47 is shown in the simplified illustrations. The dies 47 are moved into the mold and press on at least one of the deformable walls 15, 20, 31 and/or the side folds 29 of the container 1. During this movement, as indicated by the arrow 49 in FIG. 6, the fill ratio 51 rises, while air escapes via the remaining, still open hose attachment 55, with the head jaws 53 still open. FIG. 7 shows the finished state after the closure of the head jaws 53, and the container 1 is sealed and can be removed from the mold 45 after retraction of the dies 47 (see arrow 57). The previously inward-pressed container wall elastically springs back, partially reverting to its initial shape.

As known per se for plastic containers from document DE 103 47 908 A1, the container in accordance with the invention can also consist of several layers of different polymers. Instead of the shown single access with the membrane on the circular cylindrical head part 3, the container can also be equipped with several accesses, preferably on the bottom and in the head area. Furthermore, a pierceable elastomer element can be inserted prior to sealing the container 1, which can be a single- or multi-component element. In addition, the heat part 3 can be equipped with a welded-on infusion cap, as known per se from DE 10 2013 012 809 A1, for example.

As described in the following, discharge tests were performed in order to compare the discharge behavior of the container 1 in accordance with the invention to the discharge behavior of typical standard containers without the shaping means in accordance with the invention.

A bp 364 Bottel-Pack® system (rommelag, Waiblingen, Germany) was used to manufacture water-filled and sealed single-piece infusion containers in accordance with the invention and standard containers having three different rated volumes (100 ml, 250 ml, 500 ml) and with an average wall thickness of 0.35-0.52 mm from different polypropylene materials (LyondellBasell RP 270G; Borealis SB 815 MO, Flint Hills Rexene 23M2A) using the blow, fill and seal method. Before sealing, some of the containers were pre-collapsed by an 8 mm travel distance of the die (47) and an infusion cap in accordance with ISO 15759 was then welded on as described above. The containers were subsequently sterilized by autoclaving at 121° C. for 20 minutes, and then the discharge behavior was measured and the maximum filling ratio was determined.

For measuring the discharge behavior, the containers were pierced using a non-aerated infusion device in accordance with DIN EN ISO 8536-4:2011-01, and the mass of the outflowing fluid was monitored over time on an analytical balance. The discharge took place via an 0.6 mm×30 mm injection cannula in accordance with ISO 13097. The measurements were taken at an ambient temperature of 21° C. The height of the fluid column (discharge height) was 775 mm.

In order to compare bottles of different volume classes to each other, the maximum filling ratio of the container, in other words the ratio of the experimentally determined total volume to the maximum filling volume, at which the container still drains, was chosen as a quality criterion for the evaluation. Unavoidably remaining quantities of fluid, for example quantities located in the head space below the opening of the puncturing mandrel of the infusion device, were not considered.

An increase of the maximum filling ratio means that a considerably smaller volume of air is needed in comparison to the standard containers, which has very advantageous consequences in terms of reduced pack sizes, packaging and transport costs, storage and disposal costs, etc.

The three materials used, as well as their moduli of elasticity (tensile modulus at 50 mm/min in accordance with ISO 527 and optionally bending modulus at 50 mm/min in accordance with ISO 178) and their densities in accordance with ISO 1183 at 23° C., are listed in the following table.

| Make/Material | Tensile modulus of elasticity MPa | Bending modulus of elasticity MPa | Density g/cm³ |
|---|---|---|---|
| Borealis SB815MO | 475 | 425 | 0.900 |
| Lyondell Basel I RP270C | 950 | 850 | 0.900 |
| Flint Hills Rexene 23M2A | 1100 | 1000 | 0.902 |

The results for standard containers (tests 1 and 2) and for the containers in accordance with the invention (tests 3-14) are summarized in the following table.

| Test no. | Bottle type | Material | Pre-collapsing | irsv | ifa angle Degrees | Total volume in ml | Max. filling volume in ml | Min. air volume in ml | Max filling ratio % |
|---|---|---|---|---|---|---|---|---|---|
| 1 | Standard | RP270G | no | | | 205 | 139 | 66 | 68% |
| 2 | Standard | SB815MO | no | | | 220 | 161 | 59 | 73% |
| 3 | EE-200-sb | SB815MO | no | 1 | 110 | 220 | 180 | 40 | 82% |
| 4 | EE-200-sb | SB815MO | yes | 1 | 110 | 215 | 181 | 34 | 84% |
| 5 | EE-201-sb | SB815MO | no | 0.8 | 120 | 226 | 176 | 50 | 78% |
| 6 | EE-201-sb | SB815MO | yes | 0.8 | 120 | 215 | 176 | 39 | 82% |
| 7 | EE-201-rex | Rexene 23M2A | no | 0.8 | 120 | 211 | 158 | 53 | 75% |
| 8 | EE-201-rex | Rexene 23M2A | yes | 0.8 | 120 | 200 | 156 | 44 | 78% |
| 9 | EE-S00-sb | SB815MO | no | 1.1 | 115 | 640 | 563 | 77 | 88% |
| 10 | EE-500-rex | Rexene 23M2A | no | 1.1 | 115 | 590 | 478 | 112 | 81% |
| 11 | EE-500-sb | SB815MO | yes | 1.1 | 115 | 630 | 573 | 57 | 91% |
| 12 | EE-501-rp | RP270G | no | 0.9 | 105 | 585 | 474 | in | 81% |
| 13 | EE-100-sb | SB815MO | no | 0.9 | 110 | 135 | 101 | 34 | 75% |
| 14 | EE-101-rp | RP270G | no | 0.9 | 105 | 125 | 86 | 39 | 69% |

As can be discerned from the table of test results, in comparison to the standard containers a substantially higher maximum filling ratio is achievable with the invention, wherein it can also be discerned that particularly high filling ratios of up to 91% are achievable if pre-collapsing is performed (see test no. 11).

While one embodiment has been chosen to illustrate the invention, it will be understood by those skilled in the art that various changes and modifications can be made therein without departing from the scope of the invention as defined in the claims.

The invention claimed is:

1. A container, comprising:
 a container body being manufactured using a blow molding, filling and sealing method of plastic material and being autoclavable;
 opposite first and second container walls and opposite third and fourth container walls of the container body having shapes being capable of ensuring collapsing of the container body to reduce a volume of the container body when contents of the container body are delivered by infusion without ventilation of the container body despite a high filling level of the contents in the container body, the first and second container walls forming a rectangular shape of the container body and having end edges abutting a base end of a bottom of the container body, the third and fourth container walls protruding outwardly from the rectangular shape on two opposite sides of the first and second container walls, wall parts of each of the third and fourth container walls being inclined at an inclination angle towards one another in pairs and enclosing the inclination angle of less than 120 degrees, each of the third and fourth container walls having triangular side shoulder faces sloping obliquely towards one another from opposite end faces of the container body; and
 a sloping depression extending in each of the first and second container walls along a center line parallel to a longitudinal axis of the container body, ending at a distance from one of the end faces of the container body, having a base line extending along the end edge a respective one of the first and second container walls and dividing into a pair of end lines of the depression, the pair of end lines enclosing an end angle of 60 to 130 degrees at a transition to the center line and forming a triangular surface.

2. A container according to claim 1 wherein the plastic material is resistant to heat of autoclaving.

3. A container according to claim 1 wherein the plastic material is polypropylene.

4. A container according to claim 1 wherein the container body is formed in one piece with a hermetically sealed top part being arranged on the end face of the container body opposite the bottom and being capable of serving as an extraction opening for the contents of the container body.

5. A container according to claim 4 wherein a hanging tag is on the base end of the container body and opposite the end face with the top part.

6. A container according to claim 1 wherein the inclination angle does not exceed 110 degrees.

7. A container according to claim 1 wherein each triangular side shoulder face has equal sides.

8. A container according to claim 7 wherein each of the triangular side shoulder faces slopes obliquely downwardly at a slope angle of 30 to 60 degrees.

9. A container according to claim 8 wherein the slope angle is 45 degrees.

10. A container according to claim 7 wherein the plastic material is rigid polypropylene having an average thickness of 0.3 mm to 0.7 mm.

11. A container according to claim 10 wherein the average thickness is 0.4 mm to 0.5 mm.

12. A container according to claim 1 wherein the first and second container walls of the container body each has a first width; and
 the third and fourth container walls of the container body each has a second width with the first width being 0.7 to 1.2 times the second width when viewed from above the container body.

13. A container according to claim 12 wherein the first width is of 0.8 to 1.2 times the second width.

14. A container according to claim 1 wherein the end angle is 90 degrees.

15. A container according to claim 1 wherein each of the sloping depressions is planar between the end lines and base line thereof, with the end lines lying in the plane of the respective one of the first and second container walls.

16. A method for manufacturing a container, the method comprising the steps of:
 forming a container including a container body being manufactured using a blow, molding, filling and sealing method of plastic material and being autoclavable, including opposite first and second container walls and opposite third and fourth container walls of the container body having shapes being capable of ensuring collapsing of the container body to reduce a volume of the container body when contents of the container body are delivered by infusion without ventilation of the container body despite a high filling level of the contents in the container body with the first and second container walls forming a rectangular shape of the container body and having end edges abutting a base end of a bottom of the container body and with the third and fourth container walls protruding outwardly from the rectangular shape on two opposite sides of the first and second container walls, including wall parts of each of the third and fourth container walls being inclined at an inclination angle towards one another in pairs and enclosing the inclination angle of less than 120 degrees with each of the third and fourth container walls having triangular side shoulder faces sloping obliquely towards one another from opposite end faces of the container body, and including a sloping depression extending in each of the first and second container walls along a center line parallel to a longitudinal axis of the container body, ending at a distance from one of the end faces of the container body, having a base line extending along the end edge of a respective one of the first and second container walls and dividing into a pair of end lines of the depression with the pair of end lines enclosing an end angle of 60 to 130 degrees at a transition to the center line and forming a triangular surface;
 pre-collapsing the container body to reduce an air volume in the container body before sealing closed of the container body inside of a mold of the blow molding, filling and sealing method; and
 autoclaving the container body after molding, filling and sealing the container body and after removal from the mold.

17. A method according to claim 16 wherein the autoclaving takes place at a minimum temperature of 121° C. for a time period of at least 20 minutes.

18. A method according to claim 16 wherein each of the sloping depressions is planar between the end lines and base line thereof, with the end lines lying in the plane of the respective one of the first and second container walls.

* * * * *